ized Patent Office 3,064,028
Patented Nov. 13, 1962

3,064,028
NEW POLYMERIC COMPOUNDS OF ORGANOSILI-
COACETYLIDES AND PROCEDURES FOR THEIR
PRODUCTION
Herbert Jenkner, Hannover-Wulfel, Germany, assignor to
Kali-Chemie Aktiengesellschaft, Hannover, Germany
No Drawing. Filed June 20, 1960, Ser. No. 37,079
Claims priority, application Germany June 20, 1959
2 Claims. (Cl. 260—448.2)

The invention relates to new polymeric compounds of organosilicoacetylides which are obtained by conversion of organosilicodifluorides with alkali metal acetylides in the presence of an inert organic solvent or suspension medium.

As a sole starting material for the reaction with the alkali metal acetylide an organosilicodifluoride, the organic substituents of which are hydrocarbon radicals, is used having the formula $$R_xR_y'SiF_2$$

wherein R and R' mean saturated or unsaturated aliphatic and/or aromatic hydrocarbon radicals of the same or different structure and wherein $x=0$, 1 or 2, $y=2$, 1 or 0 respectively in relation to $x$ and $x+y=2$. In the case of $y=1$, R' may be hydrogen. Examples for saturated or unsaturated aliphatic hydrocarbon radicals are: methyl, ethyl, chloroethyl, vinyl, propyl, allyl, hexyl, undecyl, and dodecyl and others which like the mentioned represent lower and easily obtainable radicals. Examples for aromatic radicals bonded to the silicon atom are: phenyl, tolyl, xylenyl, naphthyl, and chlorophenyl. These cited hydrocarbon radicals are only the preferred ones, however, the invention is not limited thereto.

Of the alkali metal acetylides particularly sodium acetylide is used for the reaction, because it is most easily obtainable.

The reaction according to the invention is in most cases exothermic and in general is carried out in an organic solvent or suspension medium which is inert to the starting materials. These are hydrocarbons as hexane, octane, decane, benzene or the like, or the common ethers are used. The reaction is carried out at temperatures between room temperature and 100° C.

In the past it was known that trialkyl- and triaryl-halosilanes react with alkali metal acetylides to the corresponding monomer trialkyl- and triarylsiliconacetylides. The dialkylchlorosilanes too can be converted in the same way to the monomer dialkylsilicondiacetylides. However, for these reactions hydrocarbon solvents or suspension media may not be used.

It is surprising and was not to be expected that the reaction of the diorganosilicofluorides of the above mentioned formula with alkali metal acetylides dissolved or suspended in a hydrocarbon solvent or common ether yields a polymeric product and not a monomeric compound.

In spite of its unsaturated nature the obtained soft, wax like and colourless sbstance is stable and may be used as lubricant, catalyst, additive for plastics, paints, and lacquers, and oils.

Example 1

Within 15 minutes 61.4 parts by weight of pure diethyl-difluorosilane were added to a suspension of 50 parts by weight of sodium acetylide in 200 parts by weight of diethyl ether. The reaction was nearly finished within this time, the reaction temperature was adapted to the boiling point of the ether. After cooling the precipitated sodium fluoride was separated by filtration and the ether was removed from the filtrate leaving a residue of 55 parts by weight of a waxlike substance with a pronounced tendency to melt. This substance was free of fluorine and still contains acetylene groupings which was ascertained by infrared spectroscopy. Basing on elemental analysis its approximate composition was $$[(C_2H_5)_4Si_2(C\equiv CH)_2]_x$$

The diethyldifluorosilane had been converted quantitatively.

Example 2

The procedure described in Example 1 was followed with certain changes: As solvent hexane was used and the reaction temperature was near the boiling point of hexane. After the reaction was completed, the recovery according to the procedure of Example 1 resulted in 54.5 parts by weight of a waxlike substance which was slightly harder.

Example 3

Instead of diethyldifluorosilane dimethyldifluorosilane was reacted with sodium acetylide in an analogous way as in Examples 1 and 2 respectively. After an exothermic reaction in which the total amount of the used dimethyldifluorosilane was converted a similar reaction product was obtained which however was only partly soluble in the solvents and suspension media respectively.

Example 4

43.5 parts by weight of diphenyldifluorosilane are added to a suspension of 20 parts by weight of sodium acetylide in 80 parts by weight of diethylether under stirring. The exothermic reaction was completed after 15 minutes. The precipitated sodium fluoride was separated by suction and the ether was removed from the filtrate. The residue consisted of 42 g. of a reddish high viscous substance, which contained acetylene groupings. The conversion was quantitative based on the used diphenyl-difluorosilane.

Example 5

The procedure as described in Example 1 was followed with the exception that a diethyldifluorosilane was used which still contained diethylsilane. After the recovery according to Example 1 a very soft waxlike substance was obtained. The hydrogen bound to the silicon atom was quantitatively present even after the reaction.

Example 6

The procedure of Example 1 was followed. Instead of diethyldifluorosilane methylvinyldifluorosilane was used. A waxlike colourless silico organic acetylene compound was obtained, the vinyl group remained intact.

Example 7

A mixture of 12.5 parts by weight of dimethyldifluoro-silane and 16.2 parts by weight of diethyldifluorosilane was introduced under stirring into a suspension of 27 parts by weight of sodium acetylid in 140 parts by weight of diethylether. The reaction was exothermic, the temperature was kept at 35° C., duration of the introduction: 1 hour. After recovery according to Example 1 24 parts by weight of an oily liquid was obtained.

I claim:

1. New polymeric compounds of organosilicoacetylides which are obtained by the reaction of an alkali metal acetylide with organosilicodifluorides selected from the group consisting of $$R_xR'_ySiF_2 \text{ and } RHSiF_2$$

wherein R and R' each represent a member of the group consisting of saturated and unsaturated aliphatic and aromatic hydrocarbon radicals, $x$ and $y$ are each an integer from 0 to 2, and $x+y=2$, in a suspending medium selected from the group consisting of hydrocarbons and diethyl ether at a temperature between room temperature and 100° C.

2. A process for the preparation of new polymeric organosilicoacetylides, the organic substituents of which are constituted of hydrocarbon radicals, comprising reacting an organosilicodifluoride selected from the group consisting of $$R_xR'_ySiF_2 \text{ and } RHSiF_2$$

wherein R and R' each represent a member of the group consisting of saturated and unsaturated aliphatic and aromatic hydrocarbon radicals, $x$ and $y$ are each an integer from 0 to 2, and $x+y=2$, with an alkali metal acetylide in the presence of a suspension medium, selected from the group consisting of hydrocarbons and diethyl ether at a temperature between room temperature and 100° C.

References Cited in the file of this patent
UNITED STATES PATENTS 2,887,371    Bennett et al. _____ May 19, 1959